UNITED STATES PATENT OFFICE.

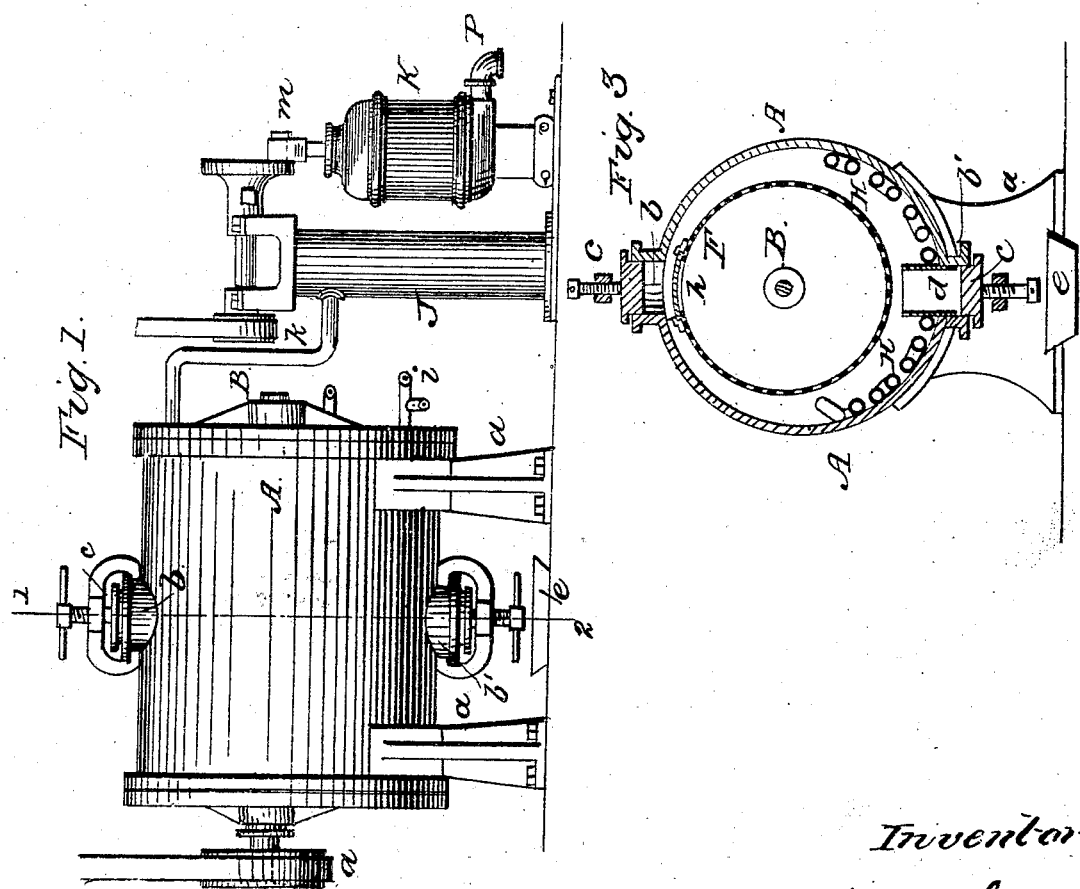

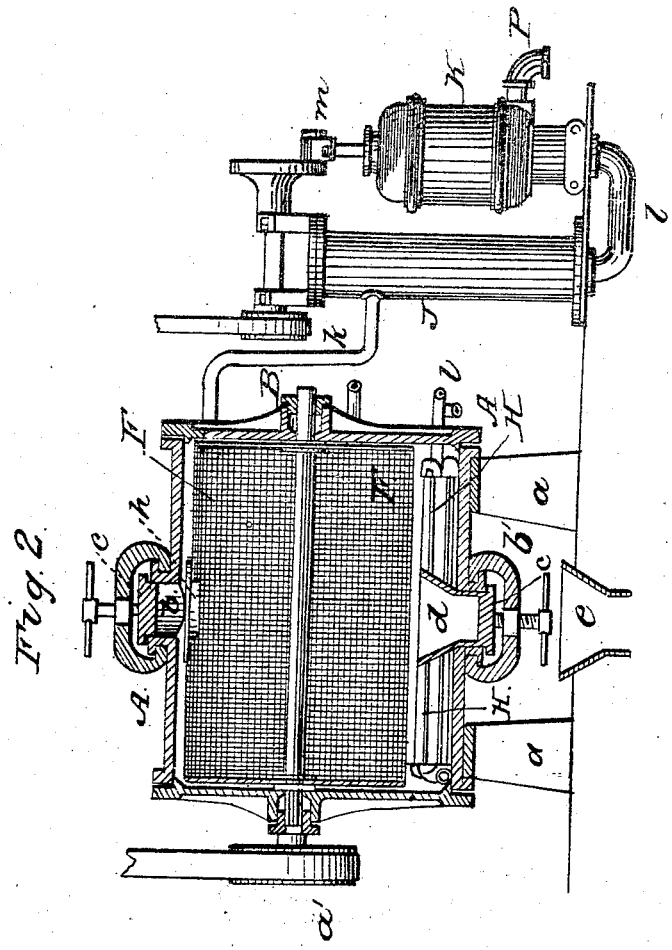

W. W. HUGHES, OF PHILADELPHIA, PENNSYLVANIA.

IMPROVED PROCESS OF DRYING MALT.

Specification forming part of Letters Patent No. 90,545, dated May 25, 1869.

*To all whom it may concern:*

Be it known that I, W. W. HUGHES, of Philadelphia, State of Pennsylvania, have invented a Mode or Process of Drying Malt; and I do hereby declare the following to be a full, clear, and exact description of the same.

My invention consists of a mode or process of drying malt by agitating and overturning the same in an air-tight vessel, subjected to heat and communicating with a condenser and vacuum-pump, or their equivalents, all of which will be fully described hereafter.

In order to enable others familiar with processes of this class to make and use my invention, I will now proceed to describe the mode of carrying the same into effect, reference being had to the accompanying drawing, which forms a part of this specification, and in which—

Figure 1 is a side elevation of one form of apparatus which may be used in carrying out my invention; Fig. 2, a longitudinal section of the same; and Fig. 3 a transverse section on the line 1 2, Fig. 1.

The process of drying malt for the purpose of destroying or of checking the further growth of the germ which has, by the previous operations of steeping, couching, and flooring, been caused to germinate, is ordinarily conducted as follows: The kilns used for the purpose are generally built of stone or brick, suitably roofed over, and provided with ventilators or openings for the escape of the vapor which rises from the drying malt, and heat is caused to pass from below through the floor of the kiln, which consists of perforated metal, wire-gauze, or tiles. The malt is spread upon the floor of the kiln to the depth of several inches, and, as it is requisite that it should be uniformly dried, the mass must necessarily be frequently overturned and agitated, which is done by shovels. The workmen, each time they perform this duty, unavoidably tread upon the malt, and the result is that a considerable quantity of the mass is thus crushed or injured. As the doors of the kiln are generally kept open while the workmen are thus engaged in overturning the malt, a considerable portion of the heat is permitted to escape, and the drying process thereby retarded. The openings in the kilns for the escape of the vapor which rises from the drying malt also permit the escape of heat, and in like manner retard the process.

Another objection to the ordinary plan is, that in consequence of the high degree of heat which it is necessary to employ, the malt is more or less scorched, and thereby deprived of a portion of its saccharine and other valuable properties.

The product, according to color and degree of heat used in drying, is termed "pale," "amber," or "brown" malt.

It is a well-known fact to practical maltsters that pale malt, which is always dried at a lower temperature than either the amber or brown varieties, contains most saccharine and other valuable properties of malt, which fact proves that the lowest practicable drying-heat is the best.

By my improved process I am enabled to rapidly dry the malt, and at the same time to retain all of its most valuable properties.

On reference to the drawing, A represents a horizontal air-tight cylinder or casing, supported by standards $a$ $a$, and on which is arranged to turn a shaft, B, provided at one end with a suitable driving-pulley, $a'$. At the top of this cylinder is an opening, $b$, covered by a cap, $c$, which is held down by a yoke and screw, and suitably packed to prevent the admission of air into the cylinder; and at the bottom of the latter is a discharge-opening, $b'$, also covered by a cap, $c$, there being above the latter opening, and within the cylinder, a funnel, $d$, and beneath the said opening, and projecting through the floor of the room or apartment, a funnel or hopper, $e$, communicating with the bin into which the malt is to be received after it has been dried.

Within the cylinder A, and attached to the shaft B, is a revolving casing, F, of thin perforated plate or wire-gauze, which is provided with an opening, $h$, for the introduction of the malt to be dried, as hereafter explained; and directly beneath this revolving casing, and also within the cylinder A, is a coil of steam-pipes, H, by which the apparatus is heated, a drip-pipe, $i$, furnished with a suitable valve, projecting from these steam-pipes through one head of the cylinder, as seen in Fig. 1.

J is a condenser, of any suitable construction, arranged at a point adjacent to the cylinder, and communicating with the same through a pipe, $k$, this condenser being attached by a pipe, $l$, to a vacuum-pump, K, the piston of which is driven by a crank-wheel, $m$, or by any other device.

In charging the apparatus, the opening $h$ of the revolving casing F is turned to a position directly beneath the opening $b$ of the cylinder, the caps being then removed, and the casing filled, or nearly filled, with the wet malt. The caps are then replaced, steam is caused to circulate through the pipes H, the casing is rotated, and a vacuum, as perfect as can be obtained, is produced within the apparatus by means of the pump K and the condenser. The vapor, as it rises from the malt, is not permitted to remain within the cylinder and retard the process of drying, but is immediately drawn off through the pipe $k$ and condensed, passing finally from the apparatus, in the form of water, through the nozzle $p$.

It will be evident that the drying process, when conducted in the above manner, will be uniform, as the mass of malt is constantly and thoroughly agitated and overturned in the revolving casing; and it will also be evident that the heat can be maintained at so low a point as not to injure the malt, from the fact that the process is conducted in a vacuum, and that the vapor is not permitted to remain in contact with or to mingle with the malt, but is immediately drawn off.

I wish it to be distinctly understood that, although I have illustrated and described specific mechanism for carrying out my invention, I do not desire to restrict myself to the same, as other and different machinery may be used with good effect; but

I claim as my invention and desire to secure by Letters Patent—

The mode or process, substantially as herein set forth, of drying malt—that is to say, by agitating and overturning the malt in an airtight vessel subjected to heat and communicating with a condenser and vacuum-pump, or their equivalents, substantially in the manner described.

In testimony whereof I have signed my name to this specification in the presence of two subscribing witnesses.

W. W. HUGHES.

Witnesses:
 THEO. BARKER,
 WM. A. STEEL.